(12) United States Patent
Macauley et al.

(10) Patent No.: US 6,840,745 B1
(45) Date of Patent: Jan. 11, 2005

(54) DIAPHRAGM PUMP INCLUDING A WOBBLE PLATE

(75) Inventors: Stephen Macauley, Northern Ireland (GB); Michael Evason, Belfast (GB); Robert Stanley McFarland, Northern Ireland (GB)

(73) Assignee: Munster Simms Engineering Limited, County Down (IE)

( * ) Notice: Subject to any disclaimer, the term of this patent is extended or adjusted under 35 U.S.C. 154(b) by 0 days.

(21) Appl. No.: 10/048,160

(22) PCT Filed: Jul. 28, 2000

(86) PCT No.: PCT/GB00/02868
§ 371 (c)(1),
(2), (4) Date: May 24, 2002

(87) PCT Pub. No.: WO01/09510
PCT Pub. Date: Feb. 8, 2001

(30) Foreign Application Priority Data

Jul. 29, 1999 (GB) .............................. 9917736

(51) Int. Cl.⁷ ................................ F04B 27/08
(52) U.S. Cl. ..................... 417/269; 417/566; 417/44.2; 137/512.15; 137/854; 92/64; 92/71
(58) Field of Search .................. 417/566, 269, 417/44.2; 137/512.15, 854; 92/64, 71

(56) References Cited

U.S. PATENT DOCUMENTS

| | | | |
|---|---|---|---|
| 1,992,491 A | | 2/1935 | Lindsay |
| 2,042,510 A | | 6/1936 | Cornelius et al. |
| 4,247,260 A | | 1/1981 | Schonwald et al. |
| 4,610,605 A | * | 9/1986 | Hartley ....................... 417/269 |
| 4,730,999 A | | 3/1988 | Tsukuda et al. |
| 4,801,249 A | | 1/1989 | Kakizawa |
| 5,791,882 A | * | 8/1998 | Stucker et al. .............. 417/269 |

FOREIGN PATENT DOCUMENTS

| | | |
|---|---|---|
| DE | 196 34 922 A | 3/1998 |
| EP | 0 402 577 A | 12/1990 |
| EP | 0744547 A2 * | 11/1996 |
| EP | 0 830 902 A | 3/1998 |
| JP | 04 262076 A | 9/1992 |

* cited by examiner

Primary Examiner—Justine R. Yu
Assistant Examiner—Emmanuel Sayoc
(74) Attorney, Agent, or Firm—Ronald E. Greigg

(57) ABSTRACT

A diaphragm pump comprises a two part casing formed of a front cover (10) and a back cover (12). A diaphragm plate (14) extends across the covers (10,12) and is secured therebetween when the covers (10,12) are fastened together. The diaphragm plate (14) has a plurality of similarly defined circular regions (16). The front cover (10) has substantially axially aligned inlet and outlet ports (18), each leading to mutually exclusive inlet and outlet chambers (22,24) respectively. A valve housing (26) is securable inside the front cover (10) and has defined therein an outlet dished valve seat (28) with a correspondingly concave resilient valve (30) seated therein. The outlet valve seat (28) has fluid passages therethrough. A plurality of inlet valve seats (34) is provided, equal in number to the number of regions, each being similarly dished and having a correspondingly concave resilient valve (36) seated therein. Each inlet valve seat (34) has fluid passages therethrough. The outlet valve (30) is in fluid communication with the outlet chamber (24) and the inlet valves (36) are in fluid communication with the inlet chamber (22). A wobble plate (40) is positioned in the back cover (12) and has a central boss (42) and a plurality of similar piston sections (44) equal in number to the number of circular regions (16) on the diaphragm plate (14). The piston sections (44) and circular regions (16) are correspondingly secured together. The wobble plate (40) is subject to nutating motion to cause reciprocating action by the circular regions (16) and provide a pumping action.

20 Claims, 8 Drawing Sheets

DIAPHRAGM PUMP INCLUDING A WOBBLE PLATE

CROSS-REFERENCE TO RELATED APPLICATIONS

This application is a 35 U.S.C. 371 application of PCT/GB 00/02868, filed on Jul. 28, 2000.

BACKGROUND OF THE INVENTION

Field of the Invention

This invention relates to a diaphragm pump incorporating a wobble plate.

SUMMARY OF THE INVENTION

The present invention is a diaphragm pump comprising a two part casing formed of a front cover and a back cover, a diaphragm plate extending across the covers and being secured therebetween when the covers are fastened together, the diaphragm plate having a plurality of similarly defined circular regions, the front cover having substantially axially aligned inlet and outlet ports, each leading to mutually exclusive inlet and outlet chambers respectively, a valve housing securable inside the front cover and having defined therein an outlet dished valve seat with a correspondingly concave resilient valve seated therein, the outlet valve seating having fluid passages therethrough, and a plurality of inlet valve seats, equal in number to the number of regions, each being similarly dished and having a correspondingly concave resilient valve seated therein, each inlet valve seat having fluid passages therethrough, the outlet valve being in fluid communication with the outlet chamber and the inlet valves being in fluid communication with the inlet chamber, and a wobble plate positioned in the back cover and having a central boss and a plurality of similar piston sections equal in number to the number of circular regions on the diaphragm, the piston sections and circular regions being correspondingly secured together, the wobble plate being subject to nutating motion to cause reciprocating action by the circular regions and provide a pumping action.

Preferably, the circular regions of the diaphragm are each provided with an outstanding lug formation and the mating surfaces of the piston sections of the wobble plate are provided with complimentary shaped slots, the securement being formed when the lug formation of each region is engaged in the slot of the corresponding piston section. The lug formation of each diaphragm and the slot of each corresponding piston section is beneficially of cruciform shape. The outer ends of the lug formation are desirably of greater length than the slots to provide a locking means in the slots. A rear diaphragm support plate may be provided in the back cover, the support plate having an equal number of similar apertures to the number of circular regions, each aperture having a walled surround, the circular regions fitting into respective apertures and being supported thereby.

Preferably also, the wobble plate boss seats and holds a bearing having a ball race, the boss having an inwardly-extending retaining flange.

Preferably also, the casing is secured to an electric motor with the drive shaft connected to the bearing. The casing has desirably a mounting bracket with a series of mounting feet fitted thereto, the feet each being substantially ovoid in plan and of resilient material, the greater dimensioned end having an upstanding headed stub pillar, each pillar mating in a open slot in the bracket, the slot being narrower at its open end to hold the respective foot in its slot. The feet are desirably similarly provided with at least one fixing hole at their narrower end and being capable of rotating about their respective mating slot.

Preferably further, the valve housing is fixed to the front cover by a screw. An integral pressure switch is beneficially provided in the back cover with the diaphragm plate being provided with a fifth defined circular region, smaller than the others, the rear diaphragm support plate having a similarly shaped aperture with wall surround to accommodate a micro-switch activated by movement of the fifth circular region serving as a pressure switch pad, the electrical wires to the micro-switch being fed internally from the front face of the motor. The valve housing, on the same side as the inlet valve seats are positioned, is preferably provided with a track leading from a hole exiting on that side and centrally provided in the outlet valve seat provided on the opposite side, the track mating with a corresponding track provided on the diaphragm plate, the mated tracks forming a passage between the hole and the fifth circular region whereby any fluid leaving the outlet chamber when under pressure through the screw travels along the passage and fills a void at the pressure pad on the opposite side of the diaphragm plate from the pressure switch causing activation of the micro-switch to stop the pump.

BRIEF DESCRIPTION OF THE DRAWINGS

An embodiment of the present invention will now be described, by way of example, with reference to the accompanying drawings, in which:

Figures 2A, 2B:
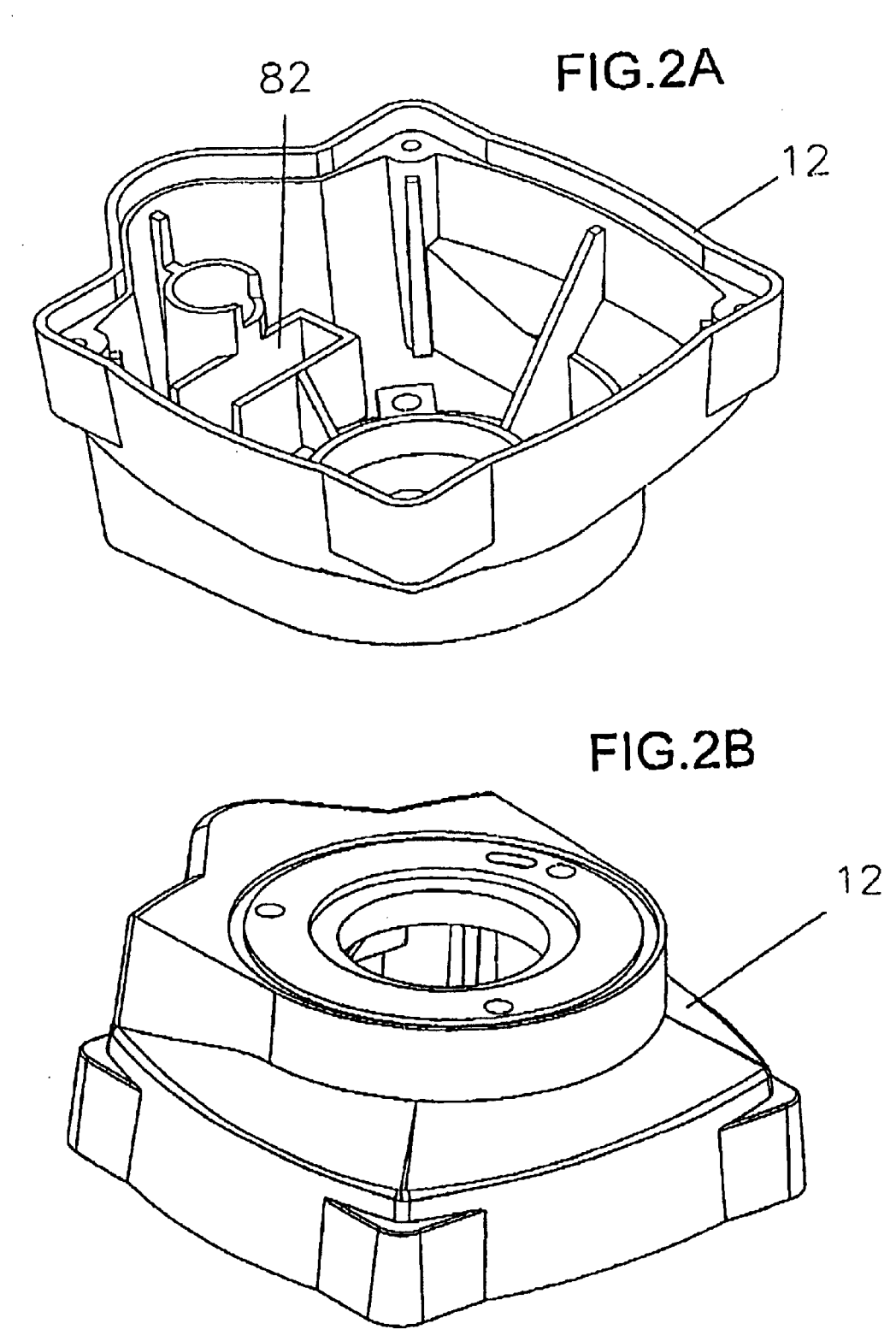

FIGS. 2A and 2B are respectively perspective views from above and from below of a back cover of the pump;

Figure 1A:
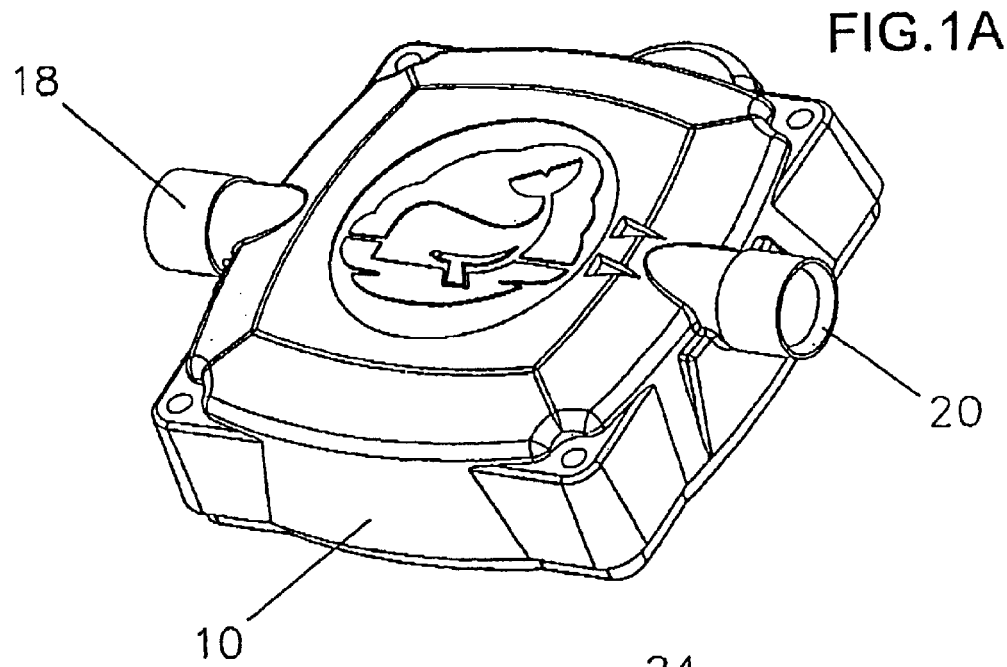
FIGS. 1A and 1B are perspective views from above and from below of a front cover of a diaphragm pump according to the present invention.
Figure 1B:
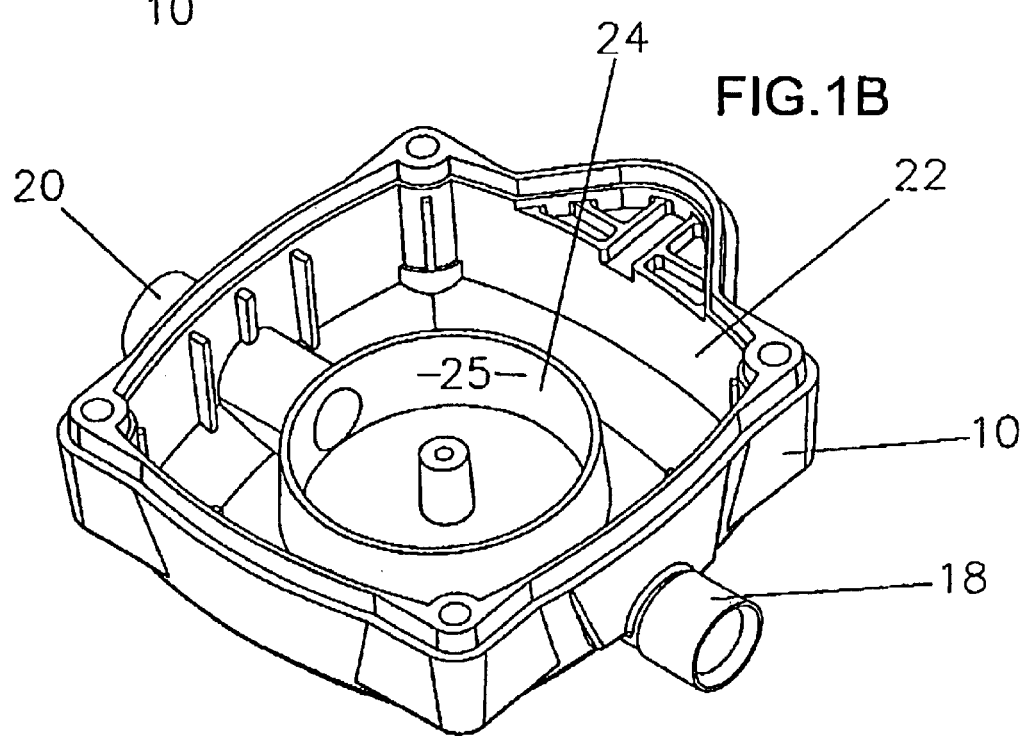
Figure 3A:
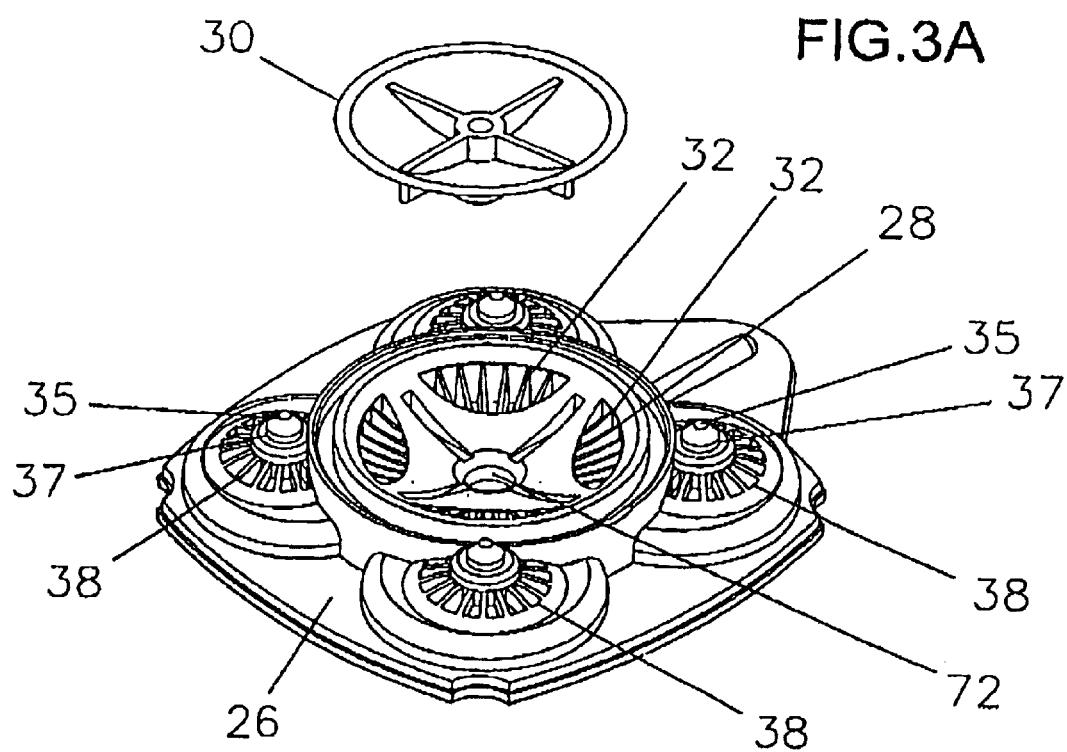
FIGS. 3A and 3B are respectively exploded perspective views from above and from below of a valve housing of the pump.
Figure 3B:
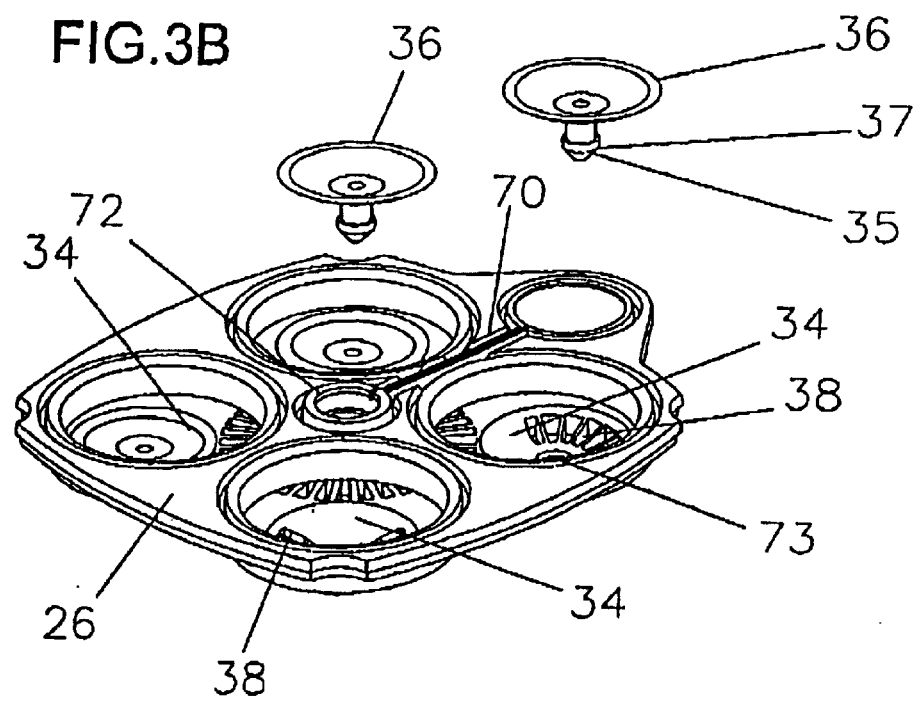
Figure 4A:
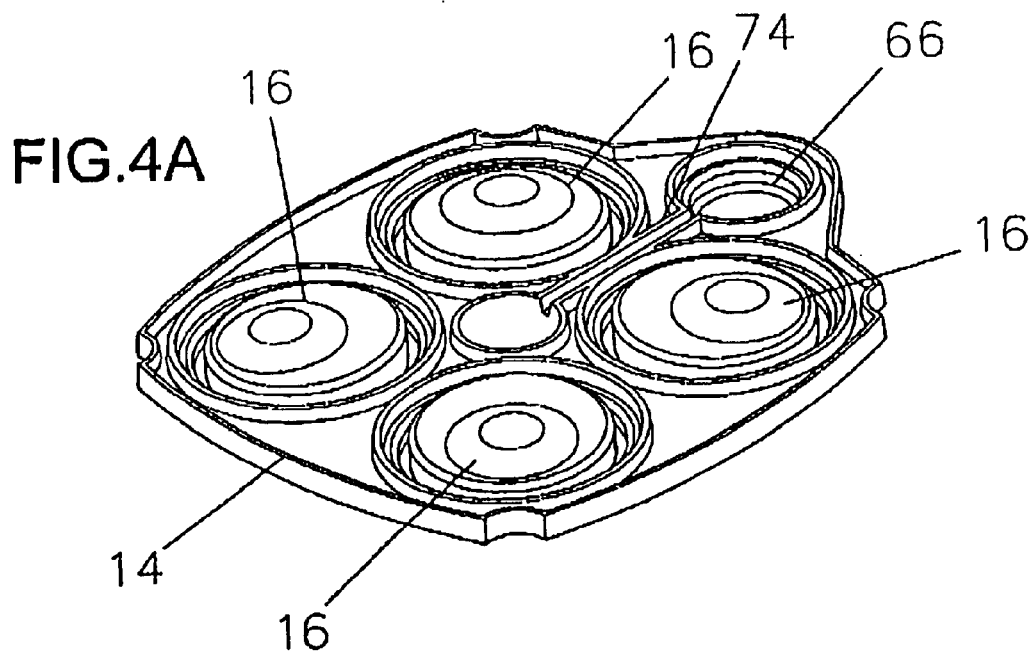
FIGS. 4A and 4B are respectively perspective views from above and from below of a diaphragm plate of the pump.
Figure 4B:
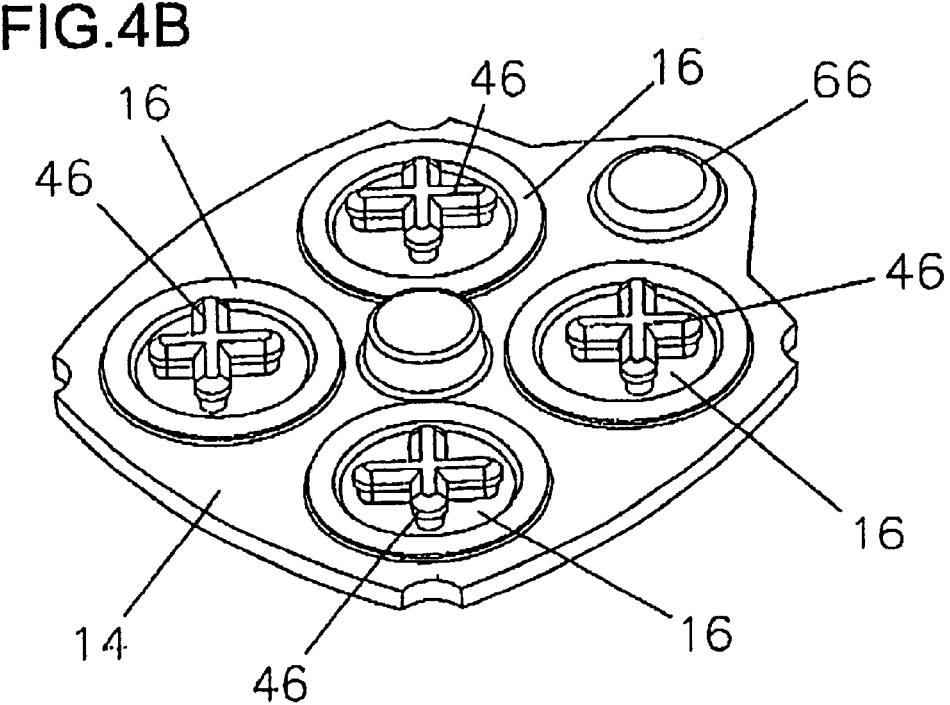
Figure 5A:
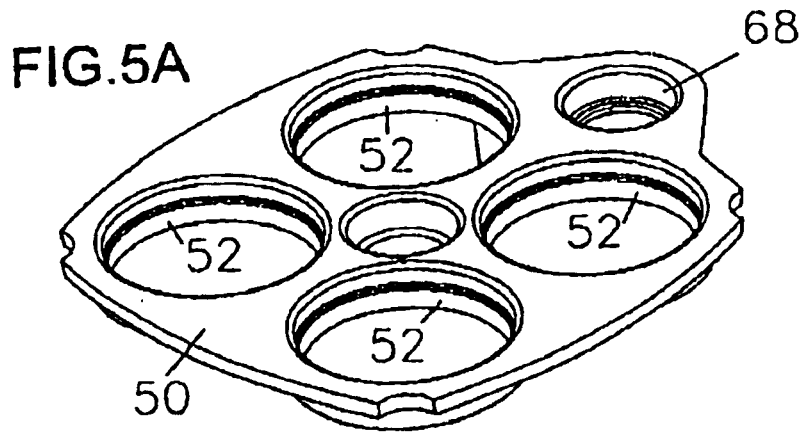
FIGS. 5A and 5B are respectively perspective views from above and from below of a diaphragm support plate of the pump.
Figure 5B:
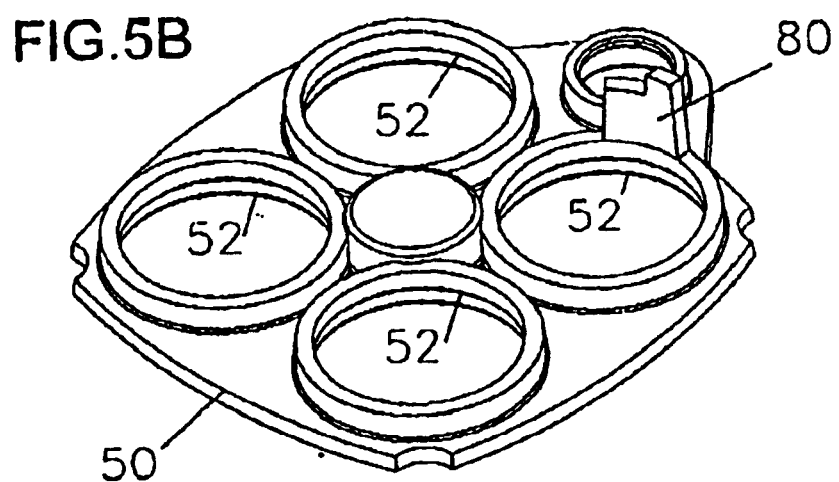

Referring to the drawings, a diaphragm pump comprises a two part casing formed of a front cover 10 and a back cover 12. A diaphragm plate 14 extends across and between the covers 10, 12 and is secured therebetween when the covers 10, 12 are fastened together by screw fasteners 13. The diaphragm plate 14 has a plurality of four similarly defined circular regions 16.

The front cover 10 has substantially axially aligned inlet and outlet ports 18,20, each leading to a mutually exclusive inlet and outlet chambers 22,24, respectively. The outlet chamber 24 is provided centrally of the front cover 10 and has a wall surround 25 through which the outlet port 20 communicates. The inlet chamber 22 is defined between the wall surround 25 and the sidewall of the front cover 10.

DESCRIPTION ON THE PREFERRED EMBODIMENTS

A valve housing 26 is substantially planar and is secured inside the front cover 10 and has defined therein on one side an outlet dished valve seat 28 with a correspondingly concave resilient valve 30 seated therein. The outlet valve seat 28 has a gridded area 32 forming fluid passages therethrough and a central hole 72. On the opposite side of the housing 26, a plurality of four inlet valve seats 34 are provided, each being similarity dished and having a corresponding concave resilient valve 36 seated therein, each inlet valve seat 34 having arcuate gridded areas 38 forming fluid passages therethrough and a central hole 73. The outlet valve seat 28 is in fluid communication with outlet chamber 24 and the inlet valve seats 34 are in fluid communication with the inlet chamber 22. Each valve 30 and 36 is formed of a dished, part-spherical portion having a post 35 radially outstanding from its rear convex face, the post having bulbous portion 37, the valve being seated by the post 35 being pushed through the hole 72, 73 respectively with the bulbous portion 37 holding the valve in position preventing unintentional removal.

A wobble plate 40 is positioned in the back cover 12 and has a central boss 42 and a plurality of four similar piston sections 44. The piston sections 44 and circular regions 16 are correspondingly secured together. The wobble plate 40 is subject to nutating motion, 'like four cylinders', to cause reciprocating action by the circular regions 16 of the diaphragm plate 14 sequentially and provide a pumping action.

The circular regions 16 of the diaphragm 14 are each provided with an outstanding lug formation 46 and the mating surfaces of the piston sections 44 of the wobble plate 40 are provided with complementary shaped slots 48. The securement between them is formed when the lug formation 46 of each region 16 is engaged in the slot 48 of the corresponding piston section 44. The lug formation 46 of each diaphragm 14 and the slot 48 of each corresponding piston section 44 is of cruciform shape. The outer ends of the lug formation 46 are of greater length that the slots 48 to provide a locking means with the slots 48.

A rear diaphragm support plate 50 is provided in the back cover 12, the support plate 50 having four similar apertures 52. Each aperture 52 has a walled surround with the circular regions 16 fitting into respective apertures 52.

The boss 42 of the wobble plate 40 seats and holds by an inwardly-extending retaining flange 56 a bearing 54 having a ball race, the bearing 54 having been insert moulded in the boss 42.

The back cover 12 of the casing is secured to an electric motor 76 with the drive shaft connected via an eccentric 78 to the bearing 54 through the back cover 12. The eccentric 78 has a knurled portion 79 to fit into the wobble plate 40 with the drive shaft of the motor located in bore 81. The motor 76 has a mounting bracket 56 with a series of mounting feet 58 fitted thereto, the feet 58 each being substantially ovoid in plan and of resilient material to dampen vibratory movement. The greater dimensioned end of each foot 58 has an upstanding headed stub pillar 60, the pillar 60 mating in an open slot 62 in the bracket 56. The slot 62 is narrower at its open end to hold the respective foot 58 in the slot. The feet 58 are similarly provided with two fixing holes 64 at their narrower end and being capable of rotating in and about their respective mating slot 62.

The valve housing 26 is fixed to the front cover 10 by a screw (not shown). An integral pressure switch (not shown) is provided in the back cover 12 with the diaphragm plate 14 being provided with a fifth defined circular region 66, smaller than the other regions 16, the rear diaphragm support plate 50 having a similarly shaped aperture 68 with wall surround to accommodate the circular region 66. A micro-switch (not shown) is retained in an enclosure 82 on the back cover 12 by an upstand 80 in the rear diaphragm support plate 50, and is activated by movement of the fifth circular region 66 serving as a pressure switch pad, the electrical wires to the micro-switch being fed internally from the front face of the motor. The valve housing 26, on the same side as the inlet valve seats 34 are positioned, is provided with a track 70 between two inlet valve seats 34 leading from a hole 72 exiting on that side and centrally provided in the outlet valve seat 28 provided on the opposite side, the track 70 mating with a corresponding track 74 provided on the diaphragm plate 14. The mated tracks 70, 74 form a passage between the hole 72 and the fifth circular region 66 whereby any fluid leaving the outlet chamber 24 when under pressure through the screw travels along the passage and fills a void at the pressure pad on the opposite side of the diaphragm plate 14 from the pressure switch causing activation of the micro-switch to stop the pump.

In use, with the inlet and outlet ports connected to a supply source and a demand requirement and the motor connected up to a supply of electricity, the pump can be switched on to pump, in an even flow, fluid, normally water, from the supply source. The motor drives the wobble plate to nutate and reciprocate the piston sections and circular regions of the diaphragm plate in a pumping action.

In a first modification, the concave resilient valve 30 and post 35 is provided with a bore strengthened by a metallic tubular liner through which the valve 30 and valve housing 26 is secured by a fastening (not shown) through a washer to the front cover 10.

Figure 9:
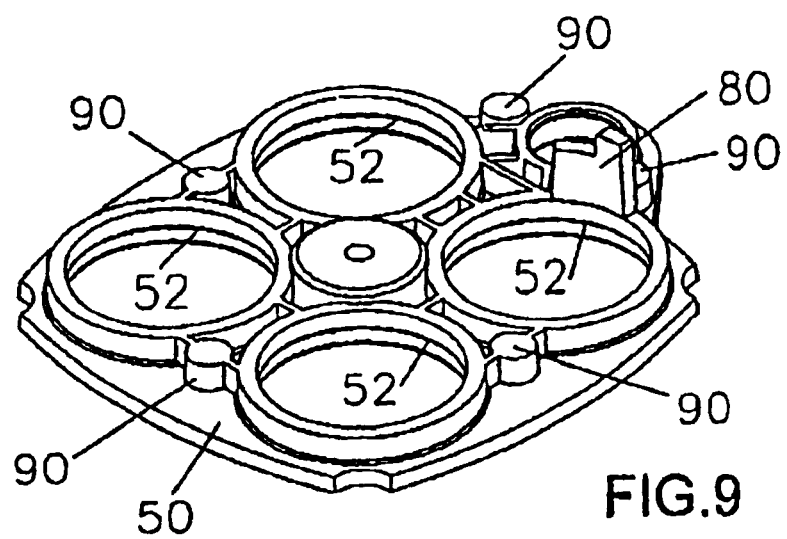
FIG. 9 is a modified diaphragm support plate.
Figure 6A:
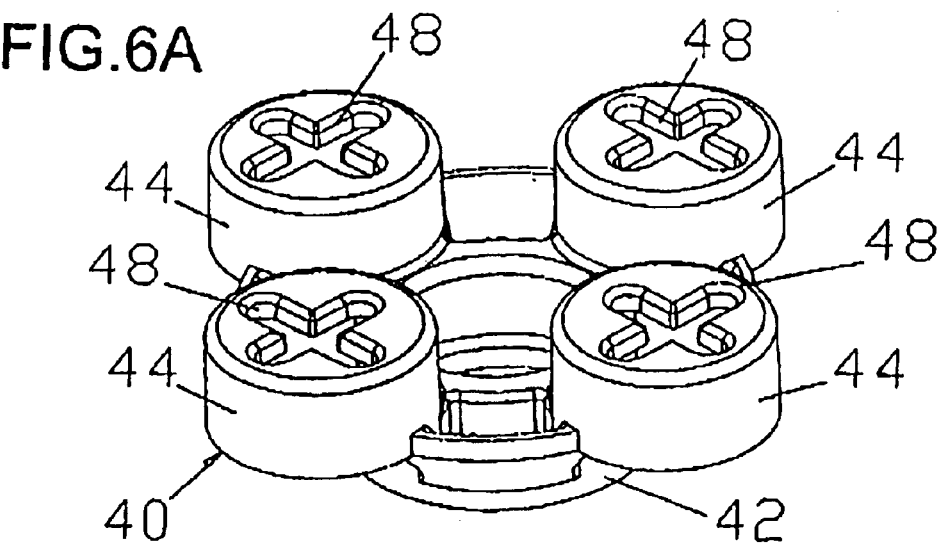
FIGS. 6A, 6B and 6C are respectively a perspective view from above, a perspective view from below, and a cross-sectional view of a wobble plate of the pump.
Figure 6B:
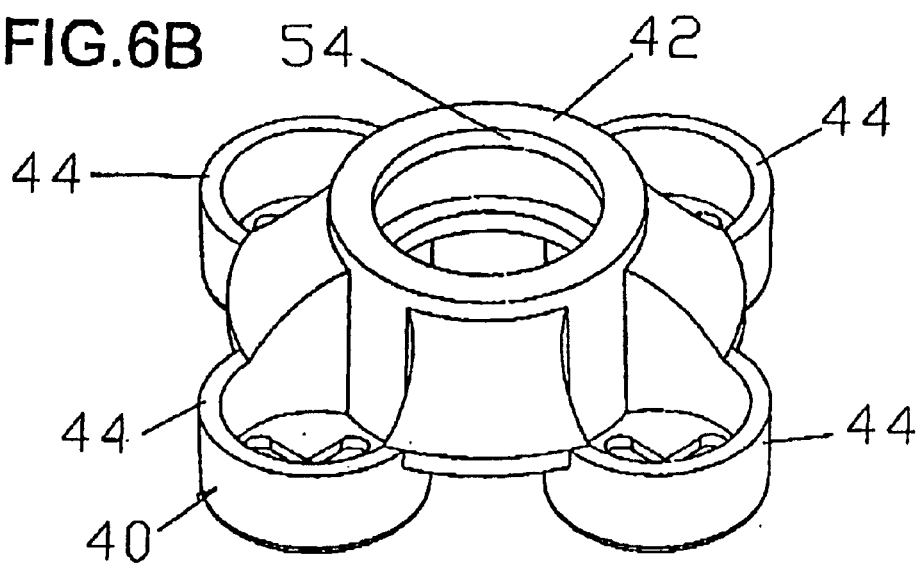
Figure 6C:
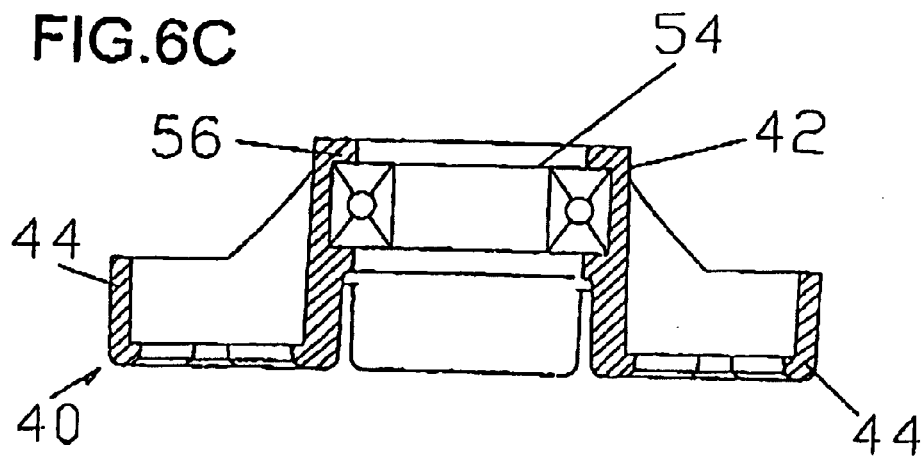
Figures 7A, 7B:
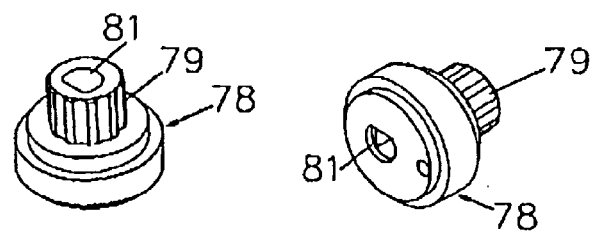
FIGS. 7A and 7B are respectively a perspective view from above and from below of an eccentric positioned between a wobble plate and the drive shaft of an electric motor.
Figure 8:
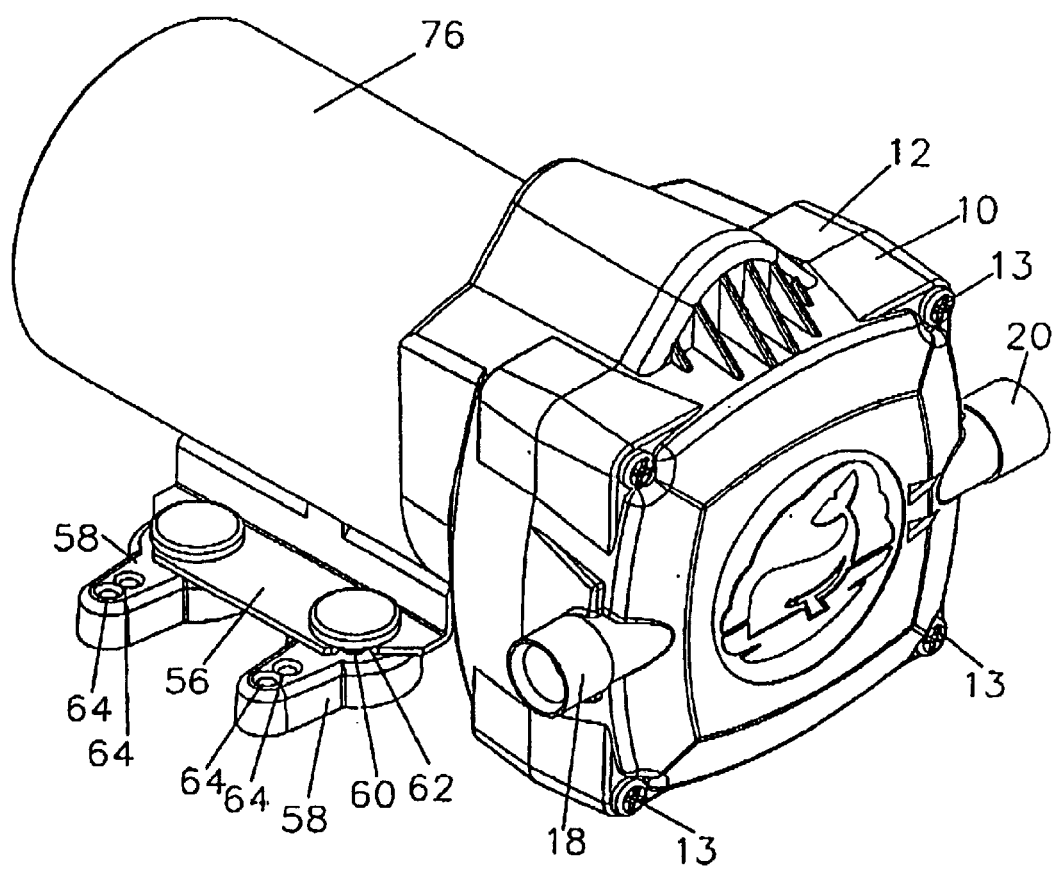
FIG. 8 is a perspective view of the pump.
Figure 10:
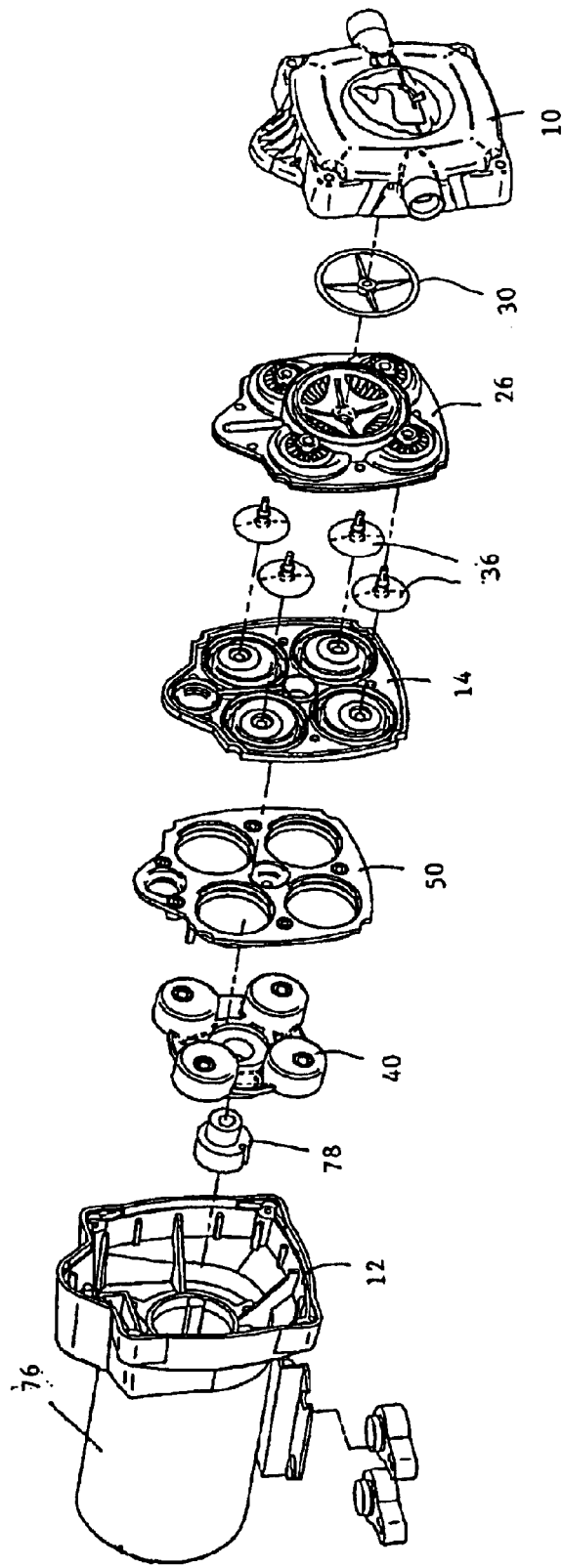
FIG. 10 is an exploded view of the pump, showing its major components.

In a second modification, the valve housing 26, the diaphragm plate 14 and the diaphragm support plate 50 are provided with five apertures (not shown) and are secured together by five fastenings (not shown) into respective bosses 90 provided on the support plate 50 (as shown in FIG. 9), the fastenings being fixed in the opposite direction to the fastening of the valve housing 26 and valve 30.

In a third modification, the lug formations 46 and slots 48 are omitted and the piston sections 44 are each screw fastened to respective circular regions 16 of the diaphragm 14.

Variations and modifications can be made without departing from the scope of the invention described above and as claimed hereinafter.

The foregoing relates to preferred exemplary embodiments of the invention, it being understood that other variants and embodiments thereof are possible within the spirit and scope of the invention, the latter being defined by the appended claims.

We claim:

1. A diaphragm pump comprising a two part casing formed of a front cover and a back cover, a diaphragm plate extending across the covers and being secured therebetween when the covers are fastened together, the diaphragm plate having a plurality of circular regions, the front cover having substantially axially aligned inlet and outlet ports, each respectively leading to an inlet chamber, or alternatively, to an outlet chamber, a valve housing securable inside the front cover and having defined therein an outlet dished valve seat with a correspondingly concave resilient outlet valve seated therein, the outlet dished valve seat having fluid passages therethrough, and a plurality of inlet valve seats, equal in number to the number of circular regions, each being similarly dished and having a correspondingly concave resilient valve seated therein, each inlet valve seat having fluid passages therethrough, the resilient outlet valve being in fluid communication with the outlet chamber and each said inlet valve being in fluid communication with the inlet chamber, and a wobble plate positioned in the back cover and having a central boss and a plurality of similar piston sections equal in number to the number of circular regions on the diaphragm plate, the piston sections and circular regions being correspondingly secured together, the wobble plate being subject to nutating motion to cause reciprocating action by the circular regions and provide a pumping action, the wobble plate central boss is adapted to seat and hold a bearing, the bearing having been insert molded in the boss with the boss having an inwardly-extending retaining flange which extends over the bearing and around the entire bearing.

2. A pump as claimed in claim 1, wherein the circular regions of the diaphragm are each provided with an outstanding lug formation and the mating surfaces of the piston sections of the wobble plate are provided with complimentary shaped slots, the securement being formed when the lug formation of each region is engaged in the slot of the corresponding piston section.

3. A pump as claimed in claim 2, wherein the lug formation of each diaphragm and the slot of each corresponding piston section is of cruciform shape.

4. A pump as claimed in claim 2 wherein the outer ends of the lug formation are of greater length than the slots to provide a locking means in the slots.

5. A pump as claimed in claim 3, wherein the outer ends of the lug formation are of greater length than the slots to provide a locking means in the slots.

6. A pump as claimed in claim 1, wherein a rear diaphragm support plate is provided in the back cover, the support plate having an equal number of similar apertures to the numbers of circular regions, each aperture having a walled surround, the circular regions fitting into respective apertures and being supported thereby.

7. A pump as claimed in claim 1, wherein the casing is secured to an electric motor with its drive shaft connected via an eccentric to the bearing.

8. A pump as claimed in claim 6, wherein the casing is secured to an electric motor with its drive shaft connected via an eccentric to the bearing.

9. A pump as claimed in claim 7, wherein the casing has a mounting bracket with a series of mounting feet fitted thereto, the feet each being substantially ovoid in plan and of resilient material, the greater dimensioned end having an upstanding headed stub pillar, each piller mating in a open slot in the bracket, the slot being narrower at its open end to hold the respective foot in its slot.

10. A pump as claimed in claim 1, wherein the valve housing is fixed to the front cover by a screw.

11. A pump as claimed in claim 2, wherein the valve housing is fixed to the front cover by a screw.

12. A pump as claimed in claim 6, wherein the valve housing is fixed to the front cover by a screw.

13. A pump as claimed in claim 9, wherein the valve housing is fixed to the front cover by a screw.

14. A pump as claimed in claim 1, further comprising an integral pressure switch provided in the back cover with the diaphragm plate being provided with a fifth defined circular region, smaller than the others, the rear diaphragm support plate having a similarly shaped aperture with wall surround to accommodate a micro-switch actuated by movement of the fifth circular region serving as a pressure switch pad, the electrical wires to the micro-switch being fed internally from the front face of the motor.

15. A pump as claimed in claim 2, further comprising an integral pressure switch provided in the back cover with the diaphragm plate being provided with a fifth defined circular region, smaller than the others, the rear diaphragm support plate having a similarly shaped aperture with wall surround to accommodate a micro-switch actuated by movement of the fifth circular region serving as a pressure switch pad, the electrical wires to the micro-switch being fed internally from the front face of the motor.

16. A pump as claimed in claim 6, further comprising an integral pressure switch provided in the back cover with the diaphragm plate being provided with a fifth defined circular region, smaller than the others, the rear diaphragm support plate having a similarly shaped aperture with wall surround to accommodate a micro-switch actuated by movement of the fifth circular region serving as a pressure switch pad, the electrical wires to the micro-switch being fed internally from the front face of the motor.

17. A pump as claimed in claim 7, further comprising an integral pressure switch provided in the back cover with the diaphragm plate being provided with a fifth defined circular region, smaller than the others, the rear diaphragm support plate having a similarly shaped aperture with wall surround to accommodate a micro-switch actuated by movement of the fifth circular region serving as a pressure switch pad, the electrical wires to the micro-switch being fed internally from the front face of the motor.

18. A pump as claimed in claim 1, wherein the valve housing, on the same side as the inlet valve seats are positioned, is provided with a track leading from a hole exiting on that side and centrally provided in the outlet valve seat provided on the opposite side, the track mating with a corresponding track provided on the diaphragm plate, the mated tracks forming a passage between the hole and the fifth circular region whereby any fluid leaving the outlet chamber when under pressure through the screw travels along the passage and fills a void at the pressure pad on the opposite side of the diaphragm plate from the pressure switch causing activation of the micro-switch to stop the pump.

19. A pump as claimed in claim 6, wherein the valve housing, on the same side as the inlet valve seats are positioned, is provided with a track leading from a hole exiting on that side and centrally provided in the outlet valve seat provided on the opposite side, the track mating with a corresponding track provided on the diaphragm plate, the mated tracks forming a passage between the hole and the fifth circular region whereby any fluid leaving the outlet chamber when under pressure through the screw travels along the passage and fills a void at the pressure pad on the opposite side of the diaphragm plate from the pressure switch causing activation of the micro-switch to stop the pump.

20. A pump as claimed in claim 9, wherein the valve housing, on the same side as the inlet valve seats are positioned, is provided with a track leading from a hole exiting on that side and centrally provided in the outlet valve seat provided on the opposite side, the track mating with a corresponding track provided on the diaphragm plate, the mated tracks forming a passage between the hole and the fifth circular region whereby any fluid leaving the outlet chamber when under pressure through the screw travels along the passage and fills a void at the pressure pad on the opposite side of the diaphragm plate from the pressure switch causing activation of the micro-switch to stop the pump.

* * * * *

UNITED STATES PATENT AND TRADEMARK OFFICE
CERTIFICATE OF CORRECTION

PATENT NO. : 6,840,745 B1
DATED : January 11, 2005
INVENTOR(S) : Stephen Macauley It is certified that error appears in the above-identified patent and that said Letters Patent is hereby corrected as shown below:

<u>Title page,</u>
Item [75], Inventors, should read as follows:
-- [75] Inventors: Michael Evason, Northern Ireland (GB); --
Item [73], Assignee, should read as follows:
-- [73] Assignee: Munster Simms Engineering Limited, Northern Ireland (GB) --

Signed and Sealed this

Fifth Day of April, 2005

JON W. DUDAS
*Director of the United States Patent and Trademark Office*